(12) United States Patent
Zhu et al.

(10) Patent No.: US 11,159,291 B2
(45) Date of Patent: Oct. 26, 2021

(54) DETERMINING A NUMBER OF SYMBOLS FOR SOUNDING REFERENCE SIGNAL TRANSMISSION

(71) Applicant: Motorola Mobility LLC, Chicago, IL (US)

(72) Inventors: Chenxi Zhu, Beijing (CN); Wei Ling, Beijing (CN); Tyler Brown, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 119 days.

(21) Appl. No.: 16/495,575

(22) PCT Filed: Mar. 24, 2017

(86) PCT No.: PCT/CN2017/078152
§ 371 (c)(1),
(2) Date: Sep. 19, 2019

(87) PCT Pub. No.: WO2018/170910
PCT Pub. Date: Sep. 27, 2018

(65) Prior Publication Data
US 2020/0092059 A1 Mar. 19, 2020

(51) Int. Cl.
*H04L 5/00* (2006.01)
*H04L 27/26* (2006.01)
*H04W 72/04* (2009.01)

(52) U.S. Cl.
CPC .......... *H04L 5/0048* (2013.01); *H04L 5/0007* (2013.01); *H04L 5/0053* (2013.01); *H04L 27/2613* (2013.01); *H04W 72/042* (2013.01)

(58) Field of Classification Search
CPC ... H04L 5/0048; H04L 5/0007; H04L 5/0053; H04L 27/2613; H04W 72/042
See application file for complete search history.

(56) References Cited

U.S. PATENT DOCUMENTS

| 2013/0215851 A1 | 8/2013 | Sato et al. |
| 2019/0288809 A1* | 9/2019 | Iyer ............... H04B 7/0482 |

FOREIGN PATENT DOCUMENTS

| CN | 101867403 A | 10/2010 |
| CN | 102487541 A | 6/2012 |
| CN | 103905104 A | 7/2014 |
| CN | 104320231 A | 1/2015 |

OTHER PUBLICATIONS

U.S. Appl. No. 62/350,43, filed Jun. 15, 2016. (Year: 2016).*
U.S. Appl. No. 62/373,850, filed Aug. 11, 2016. (Year: 2016).*
U.S. Appl. No. 62/399,921, filed Sep. 26, 2016. (Year: 2016).*
U.S. Appl. No. 62/401,062, filed Sep. 28, 2016. (Year: 2016).*
PCT/CN2017/078152, Notification of Transmittal of the International Search Report and the Written Opinion of the International Searching Authority, or the Declaration, PCT, dated Jul. 10, 2017, pp. 1-11.

* cited by examiner

*Primary Examiner* — Melvin C Marcelo
(74) *Attorney, Agent, or Firm* — Kunzler Bean & Adamson (57) ABSTRACT

Apparatuses, methods, and systems are disclosed for determining a number of symbols for sounding reference signal transmission. One apparatus (200) includes a processor (202) that determines (602) a number of orthogonal frequency-division multiplexing symbols for sounding reference signal transmission. The apparatus (200) includes a transmitter (210) that transmits (604) an indication of the number to a base unit.

20 Claims, 7 Drawing Sheets

DETERMINING A NUMBER OF SYMBOLS FOR SOUNDING REFERENCE SIGNAL TRANSMISSION

FIELD

The subject matter disclosed herein relates generally to wireless communications and more particularly relates to determining a number of symbols for sounding reference signal transmission.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CS S"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a high carrier frequency (e.g., >6 GHz) may be used, such as millimeter wave ("mmW"). In such networks, transmission in the mmW range may suffer from higher path loss than the microwave range (e.g., typically with an additional loss of 20 to 30 dB). Without increasing the transmission power, the additional path loss may be compensated by deploying a large number of antenna elements and transmission and reception beamforming at a gNB and a UE. The number of antenna elements at the gNB may be in the order of one hundred or more. Transmission beamforming with a large number of antenna elements may focus the transmission energy in a certain direction (e.g., with a narrow angle) to compensate for additional path loss. In various configurations, a large directional gain may be achieved in the transmission. In some configurations, a large number of antenna elements may be used for transmission in the microwave range in a massive-MIMO system in order to achieve high system capacity.

In certain configurations, because of a large number of antenna elements, a cost of implementing an all-digital transceiver may be high. For example, a separate RF chain may be used for each antenna element (e.g., either TX or RX) and the associated cost and power consumption may be prohibitive. In some configurations, a compromise may be to use hybrid analog/digital beamforming in which a small number of radio frequency ("RF") chains may be used to power a large number of antenna elements. Relative phases between certain antenna elements may be controlled by a separate power distribution (at the TX side)/combining (at the RX side) and phase shift network (e.g., RF precoder).

In some networks, on a TX side, a baseband signal $X_{RF}$ transmitted by the antenna array may be represented by $X_{RF}=F_{RF}F_{BB}X_{IN}$ where $X_{IN}$, $F_{BB}$, $F_{RF}$ are the baseband input signal, baseband TX precoder, and RF TX precoder respectively. A transmitter may control its TX beam with the combination of an analog precoder $F_{RF}$ and a digital precoder $F_{BB}$. Pure analog beamforming may be considered a special case of hybrid beamforming with $F_{BB}=I$. As used herein, there may be no difference between pure analog beamforming and hybrid beamforming.

In various networks, UL beam management may be supported. UL beam management may refer to the process that a UE and a gNB search and find suitable TX beam (e.g., UE) and RX beam (e.g., gNB) through beam selection, measurement, and/or refinement.

In some configurations, an important UL RS for UL beam management may be SRS. In various configurations, SRS may not be associated with UL data or control transmission, and may not primarily be used for a gNB to manage an UL beam, estimate an UL channel quality, determine an UL MIMO transmission codeword used for a UE, and for frequency selective scheduling.

In certain networks, different UEs may have different antenna configurations, including beamforming circuitry. For a UE which does not employ transmission beamforming, it may simply transmit SRS in designated resources for a gNB to estimate the UL channel from its antenna elements. For a UE with full digital beamforming, it may be capable of generating different digital TX beams, transmitted as different ports, using baseband precoding processing. Different TX beams may be generated in the same OFDM symbol, possibly multiplexed in the frequency domain as different comb. For a UE with hybrid TX beamforming, multiple beams may be generated with different baseband precoders based on a same analog beam. This may be because of a limitation of an analog phase shifter (e.g., only one wide band analog beam may be generated at a given time). If a UE needs to transmit SRS through multiple analog beams, the SRS resources corresponding to different analog beams may be in different OFDM symbols.

BRIEF SUMMARY

Apparatuses for determining a number of symbols for sounding reference signal transmission are disclosed. Methods and systems also perform the functions of the apparatus. In one embodiment, the apparatus includes a processor that determines a number of orthogonal frequency-division multiplexing symbols for sounding reference signal transmission. In various embodiments, the apparatus includes a transmitter that transmits an indication of the number to a base unit.

In some embodiments, the number of orthogonal frequency-division multiplexing symbols includes 1, 2, 3, or 4. In various embodiments, the number of orthogonal frequency-division multiplexing symbols corresponds to a number of sounding reference signal ports. In certain embodiments, in response to the number of sounding reference signal ports being 1, the number of orthogonal frequency-division multiplexing symbols is 1. In one embodiment, in response to the number of sounding reference signal ports being 2, the number of orthogonal frequency-division multiplexing symbols is 1 or 2. In some embodiment, in response to the number of sounding reference signal ports being 4, the number of orthogonal frequency-division multiplexing symbols is 1, 2, 3, or 4.

A method for determining a number of symbols for sounding reference signal transmission, in one embodiment, includes determining a number of orthogonal frequency-division multiplexing symbols for sounding reference signal transmission. In various embodiments, the method includes transmitting an indication of the number to a base unit.

One apparatuses for determining sounding reference port assignments includes a receiver that receives an indication of a number of orthogonal frequency-division multiplexing symbols for sounding reference signal transmission. The apparatus includes a processor that determines sounding reference signal port and resource assignments based on the indication. The apparatus also includes a transmitter that transmits information indicating the sounding reference signal port and resource assignments.

In some embodiments, the number of orthogonal frequency-division multiplexing symbols includes 1, 2, 3, or 4. In various embodiments, the number of orthogonal frequency-division multiplexing symbols depends on a number of sounding reference signal ports. In certain embodiments, in response to the number of sounding reference signal ports being 1, the number of orthogonal frequency-division multiplexing symbols is 1. In one embodiment, in response to the number of sounding reference signal ports being 2, the number of orthogonal frequency-division multiplexing symbols is 1 or 2. In some embodiment, in response to the number of sounding reference signal ports being 4, the number of orthogonal frequency-division multiplexing symbols is 1, 2, 3, or 4.

A method for determining sounding reference port assignments, in one embodiment, includes receiving an indication of a number of orthogonal frequency-division multiplexing symbols for sounding reference signal transmission. In certain embodiments, this indication may be transmitted as an uplink RRC message. The method also includes determining sounding reference signal port and resource assignments based on the indication. The method includes transmitting information indicating the sounding reference signal port and resource assignments.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
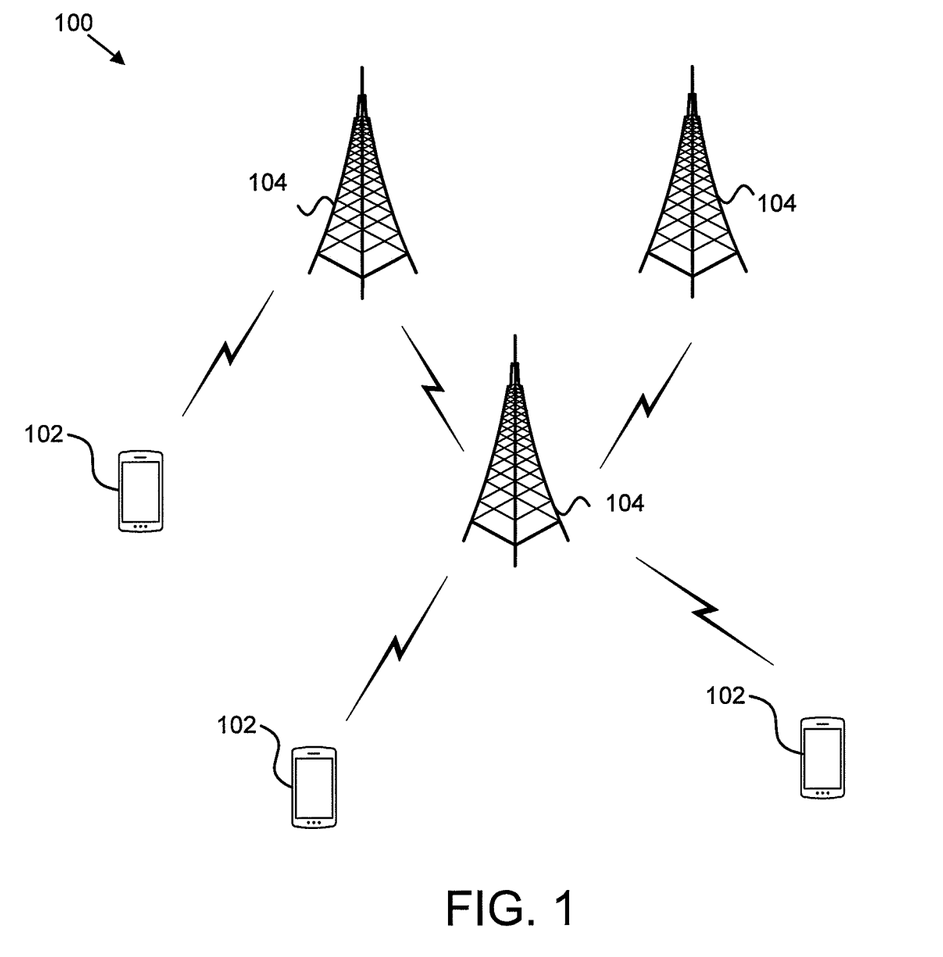
FIG. 1 is a schematic block diagram illustrating one embodiment of a wireless communication system for determining a number of symbols for sounding reference signal transmission.

FIG. 1 depicts an embodiment of a wireless communication system 100 for determining a number of symbols for sounding reference signal transmission. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive an indication of a number of orthogonal frequency-division multiplexing symbols for sounding reference signal transmission from a remote unit 102. The base unit 104 may also determine sounding reference signal port and resource assignments based on the indication. The base unit 104 may transmit information indicating the sounding reference signal port and resource assignments to the remote unit 102. Accordingly, a base unit 104 may be used for determining sounding reference port assignments.

In another embodiment, a remote unit 102 may determine a number of orthogonal frequency-division multiplexing symbols for sounding reference signal transmission. In various embodiments, the remote unit 102 may transmit an indication of the number to a base unit 104. Accordingly, a remote unit 102 may be used for determining a number of symbols for sounding reference signal transmission.

Figure 2:
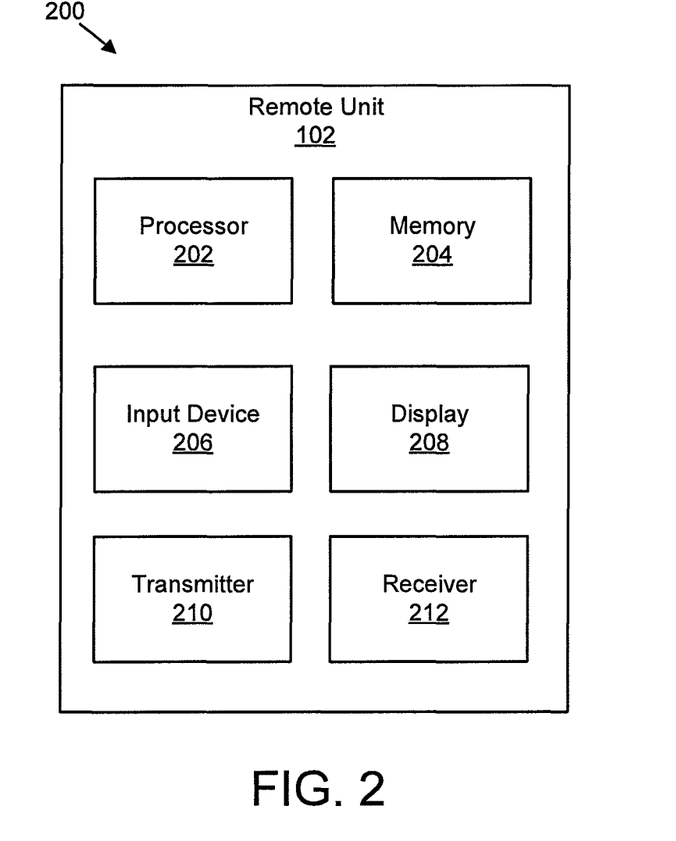
FIG. 2 is a schematic block diagram illustrating one embodiment of an apparatus that may be used for determining a number of symbols for sounding reference signal transmission.

FIG. 2 depicts one embodiment of an apparatus 200 that may be used for determining a number of symbols for sounding reference signal transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines a number of orthogonal frequency-division multiplexing symbols for sounding reference signal transmission. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to orthogonal frequency-division multiplexing symbols. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the transmitter 210 transmits an indication of a number of orthogonal frequency-division multiplexing symbols for sounding reference signal transmission to a base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
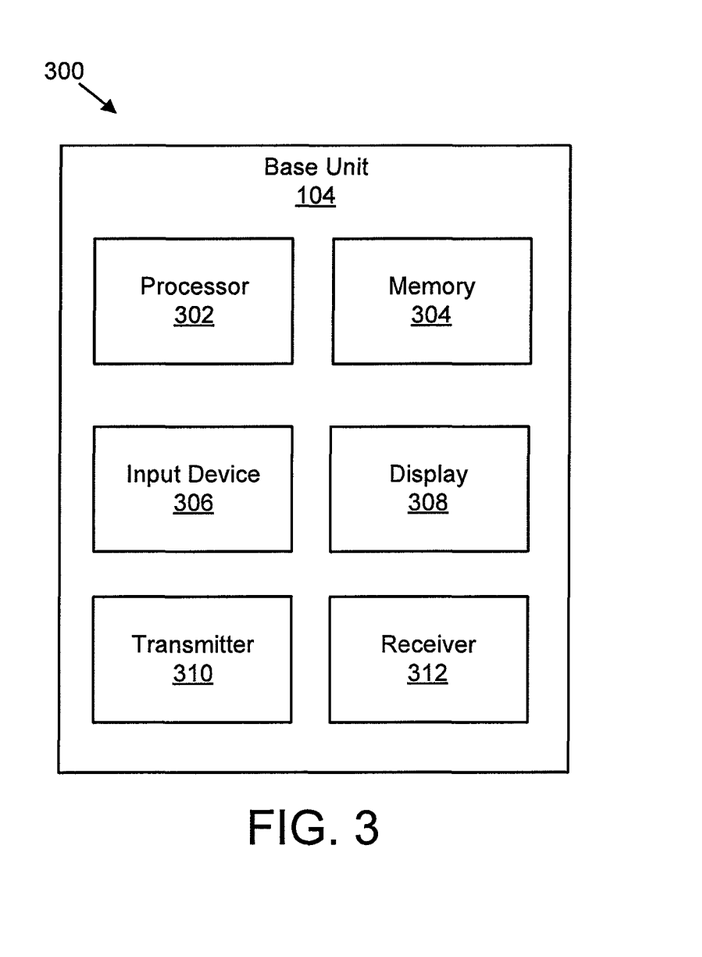
FIG. 3 is a schematic block diagram illustrating one embodiment of an apparatus that may be used for determining sounding reference port assignments.

FIG. 3 depicts one embodiment of an apparatus 300 that may be used for determining sounding reference port assignments. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive an indication of a number of orthogonal frequency-division multiplexing symbols for sounding reference signal transmission. In some embodiments, the processor 302 is used to determine sounding reference signal port and resource assignments based on the indication. In certain embodiments, the transmitter 310 is used to transmit information indicating the sounding reference signal port and resource assignments. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
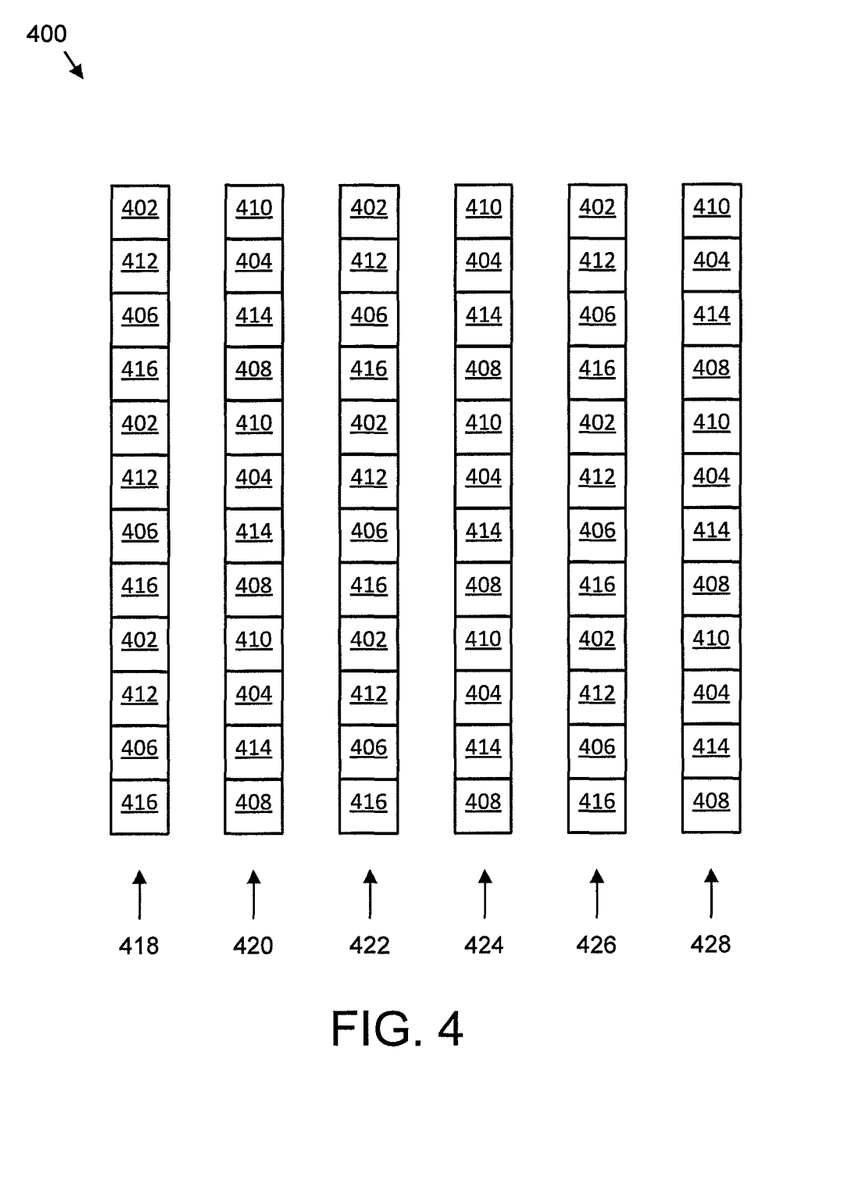
FIG. 4 is a schematic block diagram illustrating one embodiment of sounding reference port assignments.

FIG. 4 is a schematic block diagram illustrating one embodiment of sounding reference port assignments 400. In certain embodiments, a remote unit 102 may signal to a base unit 104 a number of OFDM symbols it needs to transmit SRS. In various embodiments, a remote unit 102 may only signal to a base unit 104 a number of OFDM symbols it needs to transmit SRS in response to a number of SRS ports being more than 1. The potential number of OFDM symbols used to transmit different numbers of SRS ports may be, in certain embodiments, as listed in Table 1.

TABLE 1

| Number of SRS Ports | Minimum Number of OFDM Symbols Needed |
|---|---|
| 1 | 1 |
| 2 | 1 or 2 |
| 4 | 1, 2, 3, or 4 |

In certain embodiments, a default number of OFDM symbols is 1 for any given number of SRS ports. In some embodiments, for a given remote unit 102, a number of OFDM symbols used to transmit a certain number of SRS ports may change over time. For example, in a first phase (e.g., U1) of an UL beam management process, before a remote unit 102 has a good indication of a direction of a base unit 104, the remote unit 102 may choose to transmit SRS in multiple directions, with more than one analog beams and/or with each analog beam coupled with multiple digital beams, to enable the base unit 104 to search for the direction of the remote unit 102 transmission. Doing this the remote unit 102 may use multiple OFDM symbols to transmit on the number of SRS ports used. After beam measurement and selection of initial SRS beams, the base unit 104 may instruct the remote unit 102 to, in a second phase (e.g., next phase, phase two, U2), transmit SRS further based on one of the received beams. Therefore, in the second phase the remote unit 102 may transmit multiple digital beams all based on the analog beam selected in the first phase.

Accordingly, there may be no constraint on a minimum number of OFDM symbols used in the second phase.

In some embodiments, a remote unit 102 may signal a minimum number of OFDM symbols used for SRS transmission to a base unit 104 in an RRC message or an UL control message (e.g., UCI) if the number is different from a default value of 1. When the base unit 104 receives the number of OFDM symbols that the remote unit 102 uses to transmit in a given number of ports, the base unit 104 may allocate SRS resources accordingly.

In certain embodiments, a remote unit 102 may signal to a base unit 104 the number of SRS ports it can transmit in a single OFDM symbol. This number of SRS ports may be a number of SRS ports that can be transmitted in a single OFDM symbol during a specific stage of an initialization process. This may also be a maximum number of SRS ports that can be transmitted in a single OFDM symbol by the remote unit 102 such that every SRS port is transmitted in a different analog beam.

In some embodiments, a remote unit 102 may signal a number of SRS ports used for SRS transmission to a base unit 104. a maximum number of orthogonal SRS ports that it can transmit with a single OFDM symbol.

In one embodiment illustrated in FIG. 4, a base unit 104 assigns SRS resources to two remote units 102 (e.g., UE1 and UE2), each with 4 SRS ports with a comb of 4. A first remote unit 102 has SRS ports 402, 404, 406, and 408. Moreover, a second remote unit 102 has SRS ports 410, 412, 414, and 416. Each of the first and second remote units 102 may use hybrid beamforming and may go through first and second phases of beam management with SRS. The base unit 104 assigns 4 SRS ports to each remote unit 102 for the beam management process. For beam management, it may be sufficient to transmit wideband SRS signal with relative low density in the frequency domain, with comb of 4.

Initially the first and second remote units 102 may use two analog beams to send SRS in the first phase. Accordingly, the base unit 104 may allocate SRS resources to the remote units 102 as illustrated in FIG. 4 in which the first and second remote units 102 use two symbols to transport in 4 SRS ports. For example, in a first OFDM symbol 418, the first remote unit 102 uses SRS ports 402 and 406 and the second remote unit 102 uses SRS ports 412 and 416. Moreover, in a second OFDM symbol 420, the first remote unit 102 uses SRS ports 404 and 408 and the second remote unit 102 uses SRS ports 410 and 414. Furthermore, in a third OFDM symbol 422, the first remote unit 102 uses SRS ports 402 and 406 and the second remote unit 102 uses SRS ports 412 and 416. Moreover, in a fourth OFDM symbol 424, the first remote unit 102 uses SRS ports 404 and 408 and the second remote unit 102 uses SRS ports 410 and 414. In addition, in a fifth OFDM symbol 426, the first remote unit 102 uses SRS ports 402 and 406 and the second remote unit 102 uses SRS ports 412 and 416. Moreover, in a sixth OFDM symbol 428, the first remote unit 102 uses SRS ports 404 and 408 and the second remote unit 102 uses SRS ports 410 and 414. It should be noted that OFDM symbols 418, 420, 422, 424, 426, and 428 allocated to SRS transmissions may or may not be adjacent.

As the beams are selected in the first phase and the fine tuning of second phase starts, the first and second remote units 102 may transmit on 4 SRS ports with a single analog beam. In such embodiments, the number of OFDM symbols required may be 1. After the base unit 104 receives this indication from the remote unit 102, the base unit 104 may re-assign the SRS resources to the first and second remote units 102 so that each remote unit 102 may multiplex all its 4 SRS ports in the same OFDM symbol as illustrated in FIG. 5, thereby reducing the latency in the second phase.

Figure 5:
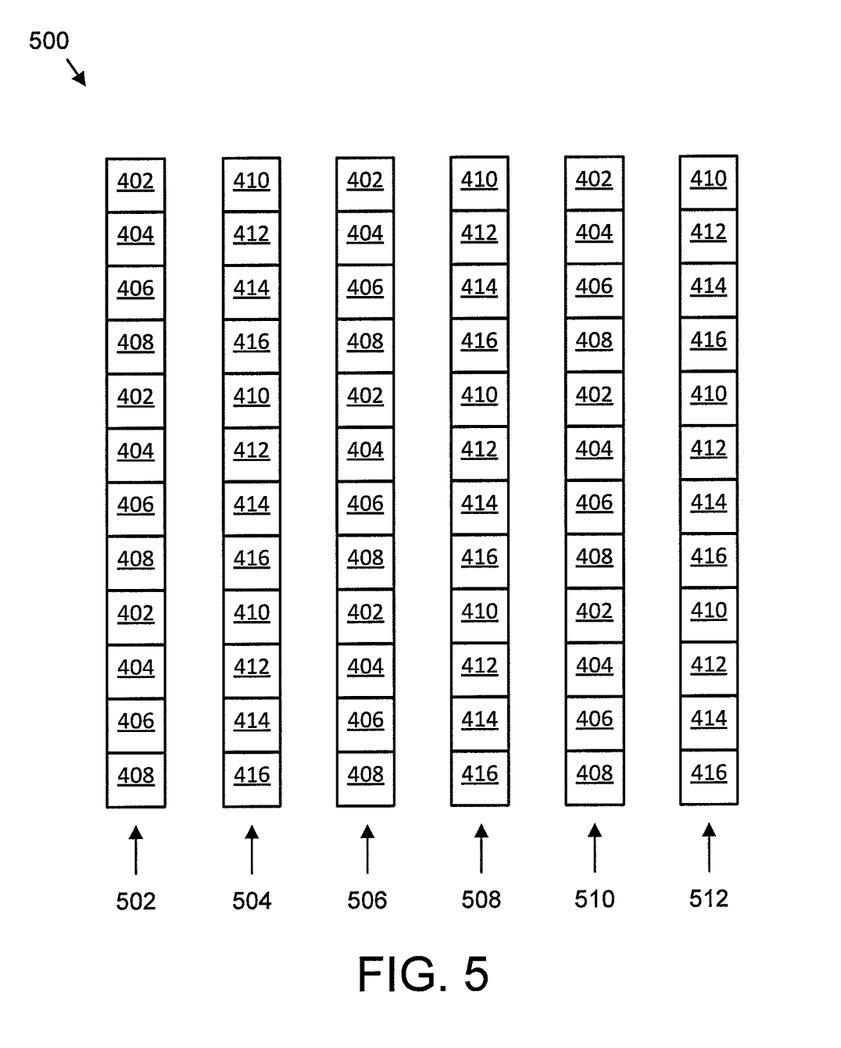
FIG. 5 is a schematic block diagram illustrating another embodiment of sounding reference port assignments.

Specifically, FIG. 5 is a schematic block diagram illustrating another embodiment of sounding reference port assignments 500. As illustrated, in a first OFDM symbol 502, the first remote unit 102 uses SRS ports 402, 404, 406, and 408. Moreover, in a second OFDM symbol 504, the second remote unit 102 uses SRS ports 410, 412, 414, and 416. Furthermore, in a third OFDM symbol 506, the first remote unit 102 uses SRS ports 402, 404, 406, and 408. Moreover, in a fourth OFDM symbol 508, the second remote unit 102 uses SRS ports 410, 412, 414, and 416. In addition, in a fifth OFDM symbol 510, the first remote unit 102 uses SRS ports 402, 404, 406, and 408. Moreover, in a sixth OFDM symbol 512, the second remote unit 102 uses SRS ports 410, 412, 414, and 416. It should be noted that OFDM symbols 502, 504, 506, 508, 510, and 512 allocated to SRS transmissions may or may not be adjacent.

Figure 6:
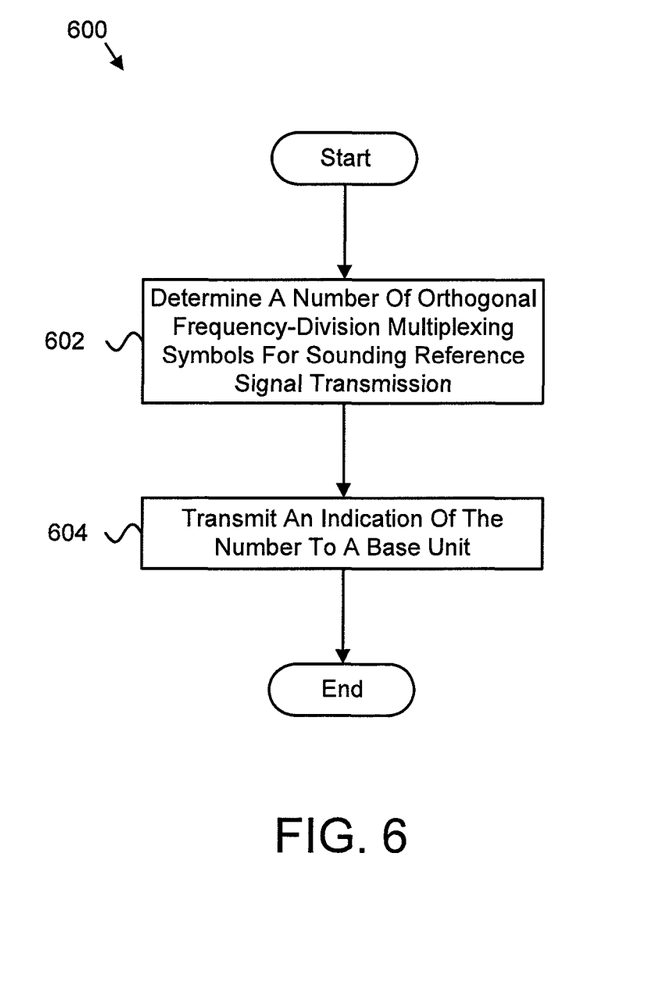
FIG. 6 is a schematic flow chart diagram illustrating one embodiment of a method for determining a number of symbols for sounding reference signal transmission.

FIG. 6 is a schematic flow chart diagram illustrating one embodiment of a method 600 for determining a number of symbols for sounding reference signal transmission. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include determining 602 a number of orthogonal frequency-division multiplexing symbols for sounding reference signal transmission. The method 600 may also include transmitting 604 an indication of the number to a base unit.

In some embodiments, the number of orthogonal frequency-division multiplexing symbols includes 1, 2, 3, or 4. In various embodiments, the number of orthogonal frequency-division multiplexing symbols corresponds to a number of sounding reference signal ports. In certain embodiments, in response to the number of sounding reference signal ports being 1, the number of orthogonal frequency-division multiplexing symbols is 1. In one embodiment, in response to the number of sounding reference signal ports being 2, the number of orthogonal frequency-division multiplexing symbols is 1 or 2. In some embodiment, in response to the number of sounding reference signal ports being 4, the number of orthogonal frequency-division multiplexing symbols is 1, 2, 3, or 4.

Figure 7:
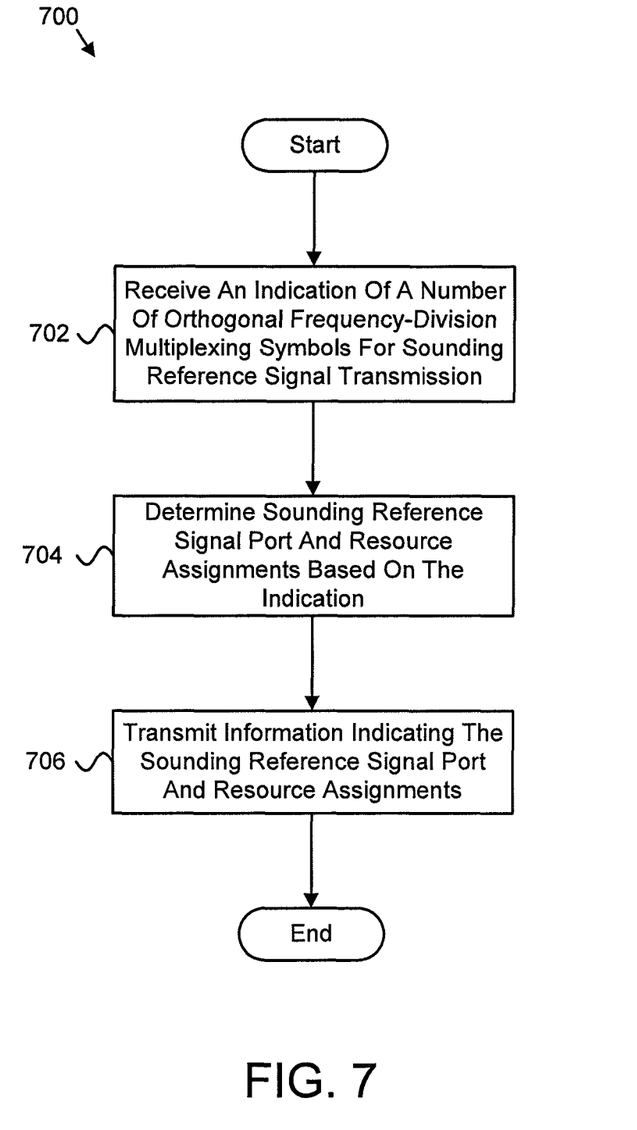
FIG. 7 is a schematic flow chart diagram illustrating one embodiment of a method for determining sounding reference port assignments.

FIG. 7 is a schematic flow chart diagram illustrating another embodiment of a method 700 for determining sounding reference port assignments. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 an indication of a number of orthogonal frequency-division multiplexing symbols for sounding reference signal transmission. The method 700 may also include determining 704 sounding reference signal port and resource assignments based on the indication. The method 700 may include transmitting 706 information indicating the sounding reference signal port and resource assignments.

In some embodiments, the number of orthogonal frequency-division multiplexing symbols includes 1, 2, 3, or 4. In various embodiments, the number of orthogonal frequency-division multiplexing symbols corresponds to a number of sounding reference signal ports. In certain embodiments, in response to the number of sounding reference signal ports being 1, the number of orthogonal frequency-division multiplexing symbols is 1. In one embodiment, in response to the number of sounding reference signal ports being 2, the number of orthogonal frequency-division multiplexing symbols is 1 or 2. In some embodiment, in response to the number of sounding reference signal ports being 4, the number of orthogonal frequency-division multiplexing symbols is 1, 2, 3, or 4.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment, the apparatus further comprising:
   a processor that determines at the user equipment a number of orthogonal frequency-division multiplexing symbols for sounding reference signal transmission; and
   a transmitter that transmits an indication of the number from the user equipment to a base unit.

2. The apparatus of claim 1, wherein the number of orthogonal frequency-division multiplexing symbols comprises 1, 2, 3, or 4.

3. The apparatus of claim 1, wherein the number of orthogonal frequency-division multiplexing symbols corresponds to a number of sounding reference signal ports.

4. The apparatus of claim 3, wherein, in response to the number of sounding reference signal ports being 1, the number of orthogonal frequency-division multiplexing symbols is 1.

5. The apparatus of claim 3, wherein, in response to the number of sounding reference signal ports being 2, the number of orthogonal frequency-division multiplexing symbols is 1 or 2.

6. The apparatus of claim 3, wherein, in response to the number of sounding reference signal ports being 4, the number of orthogonal frequency-division multiplexing symbols is 1, 2, 3, or 4.

7. A method comprising:
   determining, at a user equipment, a number of orthogonal frequency-division multiplexing symbols for sounding reference signal transmission; and
   transmitting, from the user equipment, an indication of the number to a base unit.

8. The method of claim 7, wherein the number of orthogonal frequency-division multiplexing symbols comprises 1, 2, 3, or 4.

9. The method of claim 7, wherein the number of orthogonal frequency-division multiplexing symbols corresponds to a number of sounding reference signal ports.

10. The method of claim 9, wherein, in response to the number of sounding reference signal ports being 1, the number of orthogonal frequency-division multiplexing symbols is 1.

11. The method of claim 9, wherein, in response to the number of sounding reference signal ports being 2, the number of orthogonal frequency-division multiplexing symbols is 1 or 2.

12. The method of claim 9, wherein, in response to the number of sounding reference signal ports being 4, the number of orthogonal frequency-division multiplexing symbols is 1, 2, 3, or 4.

13. An apparatus comprising a base station, the apparatus further comprising:
   a receiver that receives from a user equipment an indication of a number of orthogonal frequency-division multiplexing symbols for sounding reference signal transmission;
   a processor that determines sounding reference signal port and resource assignments based on the indication; and
   a transmitter that transmits information indicating the sounding reference signal port and resource assignments to the user equipment.

14. The apparatus of claim 13, wherein the number of orthogonal frequency-division multiplexing symbols comprises 1, 2, 3, or 4.

15. A method comprising:
   receiving, at a base station from a user equipment, an indication of a number of orthogonal frequency-division multiplexing symbols for sounding reference signal transmission;
   determining, at the base station, sounding reference signal port and resource assignments based on the indication; and
   transmitting, from the base station, information indicating the sounding reference signal port and resource assignments to the user equipment.

16. The method of claim 15, wherein the number of orthogonal frequency-division multiplexing symbols comprises 1, 2, 3, or 4.

17. The method of claim 15, wherein the number of orthogonal frequency-division multiplexing symbols corresponds to a number of sounding reference signal ports.

18. The method of claim 17, wherein, in response to the number of sounding reference signal ports being 1, the number of orthogonal frequency-division multiplexing symbols is 1.

19. The method of claim 17, wherein, in response to the number of sounding reference signal ports being 2, the number of orthogonal frequency-division multiplexing symbols is 1 or 2.

20. The method of claim 17, wherein, in response to the number of sounding reference signal ports being 4, the number of orthogonal frequency-division multiplexing symbols is 1, 2, 3, or 4.

* * * * *